US005613577A

United States Patent [19]
Collin

[11] Patent Number: 5,613,577
[45] Date of Patent: Mar. 25, 1997

[54] AUTOMOTIVE DISC BRAKE WITH IMPROVED CALIPER ASSEMBLY

[75] Inventor: David W. Collin, Stockbridge, Mich.

[73] Assignee: Ford Motor Company, Dearborn, Mich.

[21] Appl. No.: 617,004

[22] Filed: Mar. 14, 1996

Related U.S. Application Data

[63] Continuation of Ser. No. 352,948, Dec. 9, 1994, abandoned.

[51] Int. Cl.⁶ ................................................. F16D 69/04
[52] U.S. Cl. .................... 188/72.4; 188/71.8; 188/234; 188/250 G; 188/370; 188/73.32
[58] Field of Search ................. 188/72.4, 72.5, 188/370, 234, 250 G, 73.35, 73.36, 264 G, 71.7, 196 P, 18 A, 250 B, 73.1, 73.2, 71.8, 71.9, 236, 73.47, 73.44, 73.45, 196 A, 217, 196 R, 366, 367, 73.32

[56] References Cited

U.S. PATENT DOCUMENTS

| | | | |
|---|---|---|---|
| 2,756,848 | 7/1956 | Hillegass | 188/370 X |
| 2,888,103 | 5/1959 | Armstrong | 188/366 X |
| 3,019,859 | 2/1962 | Marsh | 188/196 P X |
| 3,371,753 | 3/1968 | Meier | 188/196 P X |
| 3,379,289 | 4/1968 | Hollnagel et al. | 188/196 P |
| 3,434,574 | 3/1969 | Barone | 188/196 P |
| 3,547,233 | 12/1970 | Girvan | 188/72.3 |
| 3,605,959 | 9/1971 | Beck | 188/71.8 |
| 3,722,634 | 3/1973 | Ogasawara et al. | 188/72.4 X |
| 3,887,044 | 6/1975 | Burgdorf et al. | 188/72.4 X |
| 3,941,216 | 3/1976 | Burgdorf | 188/250 G |
| 4,371,059 | 2/1983 | Seki | 188/196 P |
| 4,378,863 | 4/1983 | Baum | 188/71.9 |
| 4,428,462 | 1/1984 | Warwick et al. | 188/72.4 |
| 4,572,334 | 2/1986 | Villata . | |
| 4,581,985 | 4/1986 | Villata . | |
| 4,645,039 | 2/1987 | Lewis et al. . | |
| 4,662,483 | 5/1987 | Boeck | 188/72.3 |
| 5,032,511 | 7/1991 | Villata . | |
| 5,090,519 | 2/1992 | Golea et al. | 188/370 |
| 5,343,985 | 9/1994 | Thiel et al. | 188/73.39 |
| 5,358,078 | 10/1994 | Gajek et al. | 188/72.4 |
| 5,363,944 | 11/1994 | Thiel et al. | 188/73.45 |

FOREIGN PATENT DOCUMENTS

| | | | |
|---|---|---|---|
| 2532603 | 3/1984 | France | 188/72.3 |
| 47-50552 | 12/1969 | Japan . | |
| 45-5488 | 2/1970 | Japan | 188/72.4 |
| 1154233 | 6/1969 | United Kingdom | 188/72.4 |
| 1155820 | 6/1969 | United Kingdom | 188/72.4 |

*Primary Examiner*—Douglas C. Butler
*Attorney, Agent, or Firm*—Gregory P. Brown

[57] ABSTRACT

An automotive disc brake (10) with an improved caliper assembly (14) to prevent drag of the inner brake pad (78) on the inner braking surface (40) of the rotor (16) in a hydraulically actuated automotive disc brake assembly. The automotive disc brake assembly (10) comprising a housing (46), a rotor (16) having an annular portion (26) carried within the housing (46), a shoe assembly (72) mounted within the housing (46) having a frictional lining member (78) carried adjacent the rotor annular portion (26) and a plate member (80) fixedly secured thereto, a cylinder (60) defining an axis generally perpendicular to the rotor annular portion (26) mounted in the housing (46), a piston (48) slidably received in the cylinder (60) along the axis, an elongated operating rod (82) operatively connected between the piston (48) and the plate (80), and a pair of annular grooves (102 and 104) bridged by a snap ring (100) for preventing substantial axial movement between the rod (82) and both the plate (80) and the piston (48) whereby the piston (48) is movable in a direction along the axis to frictionally engage the lining member (78) against the rotor annular portion (26) and in an opposite direction to disengage the lining member (78) from the rotor annular portion (26).

1 Claim, 2 Drawing Sheets

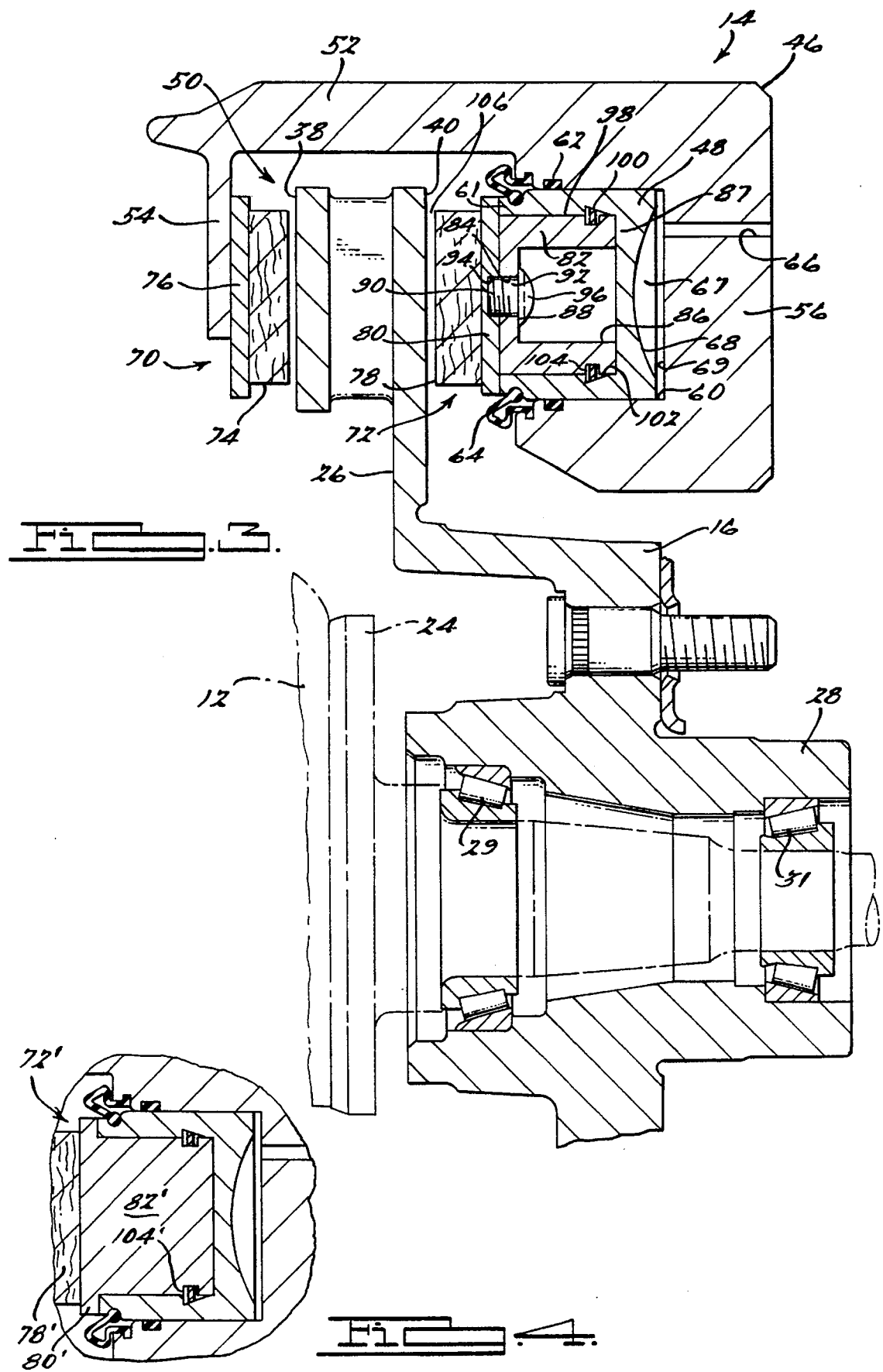

AUTOMOTIVE DISC BRAKE WITH IMPROVED CALIPER ASSEMBLY

This is a continuation of application Ser. No. 08/352,948 filed Dec. 9, 1994 now abandoned.

BACKGROUND OF THE INVENTION

This invention relates generally to hydraulically actuated automotive disc brake assemblies and more particularly to brake shoe actuator construction for reducing brake pad drag on the rotor in such assemblies.

Brake pad drag is a phenomenon which results in automotive disc brake assemblies when the brake pads remain in contact with the rotor surface after the piston has been retracted. Brake pad drag is undesirable because it reduces usable vehicle horsepower and adversely impacts fuel economy. Additionally, brake pad drag may produce undesirable noise which can interfere with the quiet ride of the motor vehicle.

Several efforts to reduce brake pad drag have been made in the past. For example, many current disc brake assemblies use roll-back seals in combination with two- or three-pronged retainer clips riveted to the backing plate of the inner brake shoe assembly to retract the brake pad from the rotor. The roll-back seal, placed between the piston and the cylinder, is designed to retract the piston into the cylinder from 0.005 to 0.015 inches. Ideally, the pronged retainer clip engages the piston so that when the roll-back seal retracts the piston, the inner brake pad retracts from the rotor equidistant with the piston. In practice, however, the retainer clip is prone to bending, misalignment during assembly or loss of spring tension which prevents the clip from functioning as designed. As a result, substantial lost motion between the inner brake pad and the piston is not prevented which may result in dragging of the brake pad against the rotor.

A need therefore exists for an inner brake shoe assembly which positively retains the brake shoe with the piston to eliminate brake pad drag when the piston retracts.

SUMMARY OF THE INVENTION

It is therefore an object of the present invention to prevent drag of the inner brake pad on the inner braking surface of the rotor in a hydraulically actuated automotive disc brake assembly.

The above object is achieved and the disadvantages of prior approaches are overcome by the present invention which provides an automotive disc brake assembly which has a housing, a rotor having an annular portion carried within the housing, a shoe assembly mounted within the housing having a frictional lining member carried adjacent the rotor annular portion and a plate member fixedly secured thereto, a cylinder defining an axis generally perpendicular to the rotor annular portion mounted in the housing, a piston slidably received in the cylinder along the axis, an elongated operating rod operatively connected between the piston and the plate, and means for preventing substantial axial movement between the rod and both the plate and the piston whereby the piston is movable in a direction along the axis to frictionally engage the lining member against the rotor annular portion and in an opposite direction to disengage the lining member from the rotor annular portion.

Preferably, the operating rod is integrally formed with the plate, Alternatively, however, the operator rod may further include fastening means for securing the operator rod to the plate, such as a threaded fastener or a weld.

The means for preventing substantial axial movement has a first annular groove on an outer surface of the operating rod and engaging means, such as a snap ring, disposed in the groove for engaging an inner surface of the piston. The engaging means may further include a second annular groove on an inner surface of the piston in axial registration with the first annular groove so that the snap ring bridges both grooves.

BRIEF DESCRIPTION OF THE DRAWINGS

Other objects and advantages of the present invention will become even more apparent by the following description with reference to the accompanying drawings, in which like numbers followed by a prime (') refer to like parts throughout the several views, and in which:

FIG. 3 is a cross-section view of a portion of the embodiment shown in FIG. 1; and FIG. 4 is a cross-section view of another embodiment of the invention.

DETAILED DESCRIPTION OF THE PREFERRED EMBODIMENT

Figure 1:
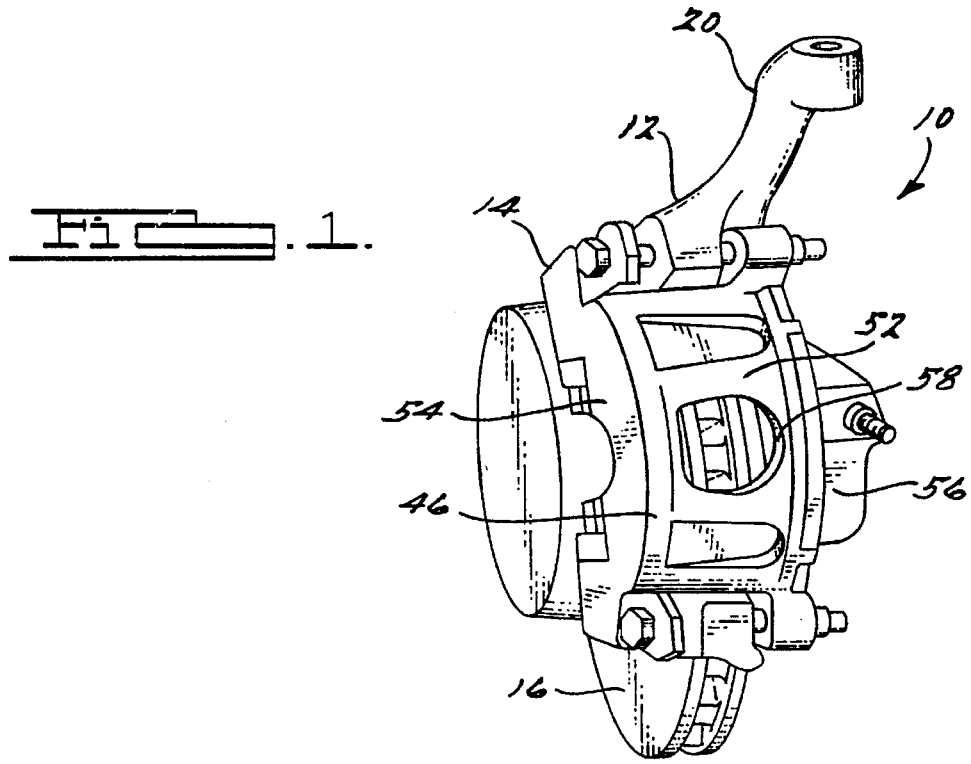
FIG. 1 is a perspective view of an automotive disc brake assembly incorporating one embodiment of the invention.
Figure 2:
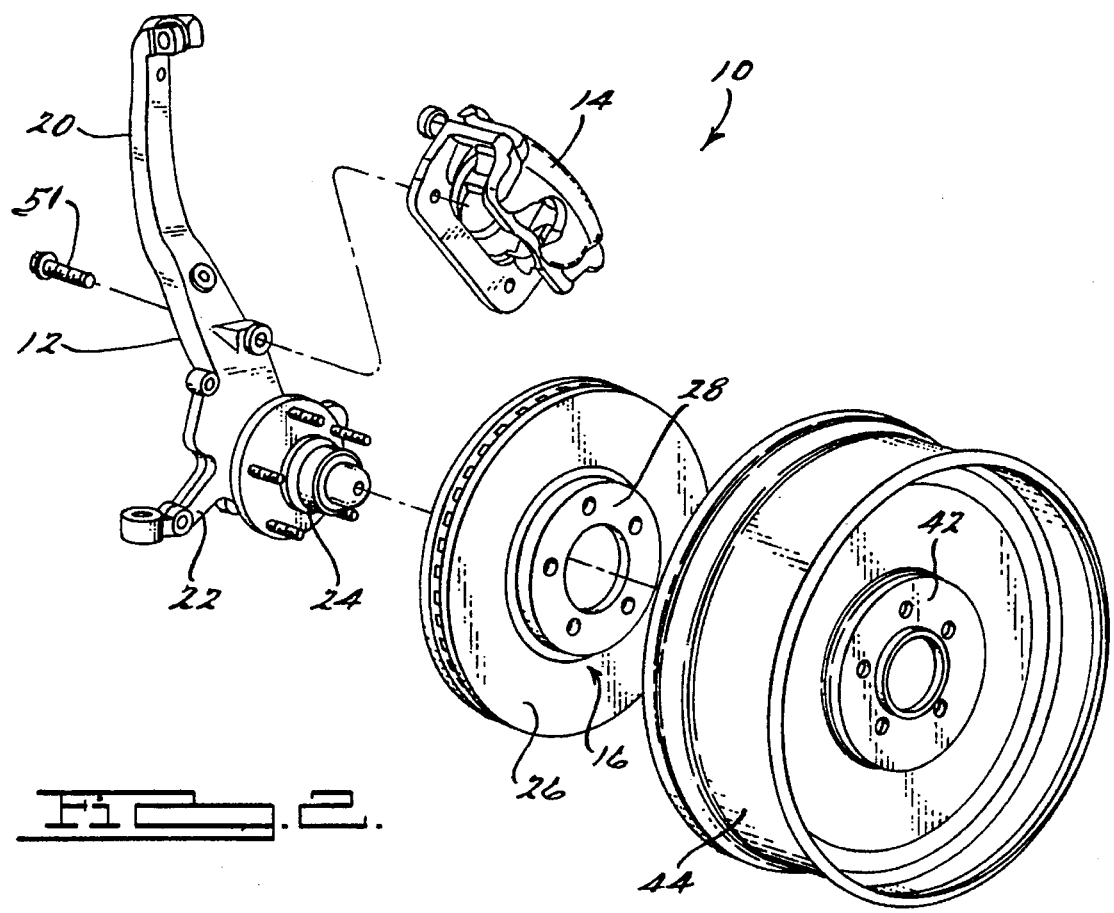
FIG. 2 is an exploded view of the disc brake assembly of FIG. 1.

Referring first to FIGS. 1 and 2, an automotive disc brake assembly 10 is shown including a caliper anchor plate or torque plate 12, a floating caliper assembly 14 and a rotor 16. The disc brake assembly 10 is rigidly secured to a wheel support member (not shown) by the caliper anchor plate 12. The anchor plate 12 is constructed to provide connection with upper and lower suspension arms of the automobile. An upwardly extending arm 20 connects in conventional fashion to an upper suspension arm of the vehicle (not shown). A rearwardly extending steering arm 22 connects in conventional fashion to the steering linkage of the vehicle. The anchor plate 12 further includes a spindle portion 24 which rotatably supports the rotor 16 with respect to the caliper anchor plate 12.

The rotor 16 is generally hat-shaped with a radially outer annular portion 26 and a central hub portion 28 which rotatably mounts on the spindle 24 in a conventional fashion as through roller bearings 29 and 31 FIG. 3). The annular portion 26 of the rotor 16 further includes outer and inner braking surfaces 38 and 40 (FIG. 3). The hub portion 28 of rotor 16 is fixedly secured to a wheel 42 which has a rim portion 44 that supports a conventional pneumatic tire.

Turning next to FIG. 3, the disc brake caliper assembly 14 comprises a housing 46, a piston 48 and a shoe assembly 50. The housing 46 is mounted to the anchor plate 12 as by a fastener 51 and is slidably mounted in known fashion with respect to the anchor plate 12 to straddle the rotor 16. The housing 46 is substantially saddle-shaped with an arcuate bridge portion 52, a reaction portion 54, and an actuation portion 56.

The bridge portion 52 generally matches the periphery of the rotor 16 and interconnects the reaction portion 54 and the actuation portion 56 and defines a pocket through which the rotor 16 rotates. Preferably, the bridge portion 52 includes an opening 58 (shown in FIG. 1) which permits visual inspection of the shoe assembly 50 carried within the housing 46.

The reaction portion 54 depends from the bridge portion 52 of the housing 46 for acting on the brake shoe assembly 50.

The actuation portion 56 of the housing 46 includes a bore or cylinder 60 that defines an axis generally perpendicular to the annular portion 26 of the rotor 16. The generally cylindrical piston 48 is slidably received in the cylinder 60 so that one end 61 faces the annular portion 26 of the rotor 16. An annular roll-back seal 62 seals the clearance between the inner diameter of the cylinder 60 and the outer diameter of the piston 48. A flexible dust boot seal 64 interposed between the cylinder 60 and the piston 48 protects the cylinder 60 from contamination.

A fluid port 66 passes through the actuation portion 56 of the housing 46 and connects with the interior of the cylinder 60. The port 66 provides a means for connecting a hydraulic pressure source, such as a brake master cylinder (not shown), to a chamber 67 defined by the area between the end 68 of the piston 48 and the end 69 of the cylinder 60.

The shoe assembly 50 is mounted within the housing 46 between the reaction portion 54 and the actuation portion 56 and comprises outer and inner brake shoe assemblies 70 and 72. The outer brake shoe assembly 70 is secured to the reaction portion 54 of the housing 46 and includes a frictional lining member 74 (i.e. brake pad) which is affixed to a rigid backing plate member 76 so that it aligns with the outer braking surface 38 of the rotor 16.

The inner brake shoe assembly 72 is interposed between the piston 48 and the inner braking surface 40 and includes a frictional brake liner or lining member 78, a backing plate member 80 and an elongated operating rod 82 operatively connected to the piston 48.

As shown in FIG. 3, the operating rod 82 is a generally cylindrical member of fixed length with a center bore 84 extending through the rod. A blind bore 86 having an inner diameter greater than the center bore 84 extends from the end 87 received in the piston to create a shoulder 88. A threaded portion 90 of a cap screw 92 passes through the center bore 84 and threadedly couples with a threaded opening 94 in the backing plate member 80. A head portion 96 of the cap screw 92 abuts the shoulder 88 to clampingly secure the operating rod 82 to the backing plate member 80 and create a positive connection between the operating rod 82 and the backing plate member 80 eliminating lost motion therebetween.

The piston 48 has a blind bore 98 which extends from the end 61 facing the backing plate member 80. The inner diameter of the bore 98 is slightly greater than the outer diameter of the operating rod 82 so that the operating rod 82 can be slidably received in the bore 98 to operatively connect the rod to the piston. The operating rod 82 is positively retained in the piston 48 with a snap ring 100 that bridges a pair of annular grooves 102 and 104 having a width only slightly greater than the width of the snap ring. The first groove 102 is located within the bore 98 on the inner surface of the piston 48. The second groove 104 is located on the outer surface of the operating rod 82 so that the grooves axially register when the rod is received in the piston. The second groove 104 is deep enough to allow for compression of the snap ring 100 to facilitate installation of the rod 82 into the piston 48. Once the rod 82 is inserted so that the snap ring 100 engages, an advantage is thereby obtained of preventing substantial axial movement between the piston 48, the operating rod 82 and the backing plate member 80.

An alternative embodiment of the inner brake shoe assembly 72' is shown in FIG. 3 wherein the operating rod 82' is integrally formed with the backing plate member 80'. This embodiment has the advantage of reducing complexity and cost by eliminating the need for the bores and the cap screw. Another embodiment not shown in the figures similarly eliminates the cap screw and bores by welding the operating rod to the backing plate member to create the desired positive connection.

The presently described embodiments are shown in the drawings in association with the left front driven wheel of an automobile. One skilled in the art will quickly recognize, however, that the invention can be used to advantage in other disk brake caliper assembly applications.

OPERATION

The operation of the embodiment shown in the drawings will now be described with concurrent reference to FIGS. 1 and 3. The rotor 16 rotates when the vehicle is moving. During brake application, pressurized fluid is admitted through the fluid port 66 into the chamber 67 between the piston 48 and the cylinder 60. Pressurized fluid in the chamber 67 causes the piston 48 to move toward the brake rotor 16. This action forces the inner brake shoe assembly 72 to move into engagement with the inner braking surface 40 of the rotor 16. The bridge portion 52 of the housing 46 is drawn in the opposite direction by the pressurization of the chamber. This causes the reaction portion 54 of the housing 46 to draw the outer brake shoe assembly 70 into engagement with the outer braking surface 38 of the rotor 16. Thus, when the chamber of the cylinder is pressurized, the actuation and reaction portions of the housing are activated to cause the inner and outer brake shoe assemblies to clampingly engage the rotor.

During braking, the roll-back seal 62 stretches as the piston 48 moves toward the rotor 16. As the frictional lining 78 wears, the seal 62 slides on the outer surface of the piston 48. An advantage is thereby obtained of allowing for self-adjustment of the inner brake shoe assembly 72 to compensate for brake pad wear.

When the brakes are released, the pressurized fluid is evacuated from the chamber 67 through a drain port (not shown) fluidly connected to a control valve (not shown). The stretched roll-back seal 62 retracts the piston 48 into the cylinder 60 a slight distance. Because of the positive connections between each of the components of the inner shoe assembly 72, this slight retraction obtains the clearance 106 between the rotor 16 and the inner brake pad 78 necessary to prevent dragging of the brake pad 78 on the rotor 16 when pressurized fluid is not supplied to the chamber 67. An advantage is thereby obtained of preventing undesirable drag which reduces overall vehicle horsepower and hastens inner brake pad wear.

If, by viewing through the opening 58 in the housing 46, it is determined that the linings are worn and need to be replaced, the housing may be removed as known in the art from engagement with the anchor. To replace the inner brake pad 78, the inner brake shoe assembly 72 can be removed by pulling on the backing plate member 80 with a force sufficient to compress the snap ring 100 into the annular groove 102 located on the operating rod 82 and allow removal of the operating rod from the piston.

The foregoing description presents the preferred embodiment of this invention. Modifications and alterations may occur to those skilled in the art which will come within the scope and spirit of the present invention. Accordingly, it is intended that the scope of the invention be limited to only the following claims.

What is claimed:

1. An automotive disc brake assembly comprising:

a housing;

a rotor having an annular portion carried within said housing;

a shoe assembly mounted within said housing having a frictional lining member carried adjacent said rotor annular portion and a plate member fixedly secured thereto;

a cylinder defining an axis generally perpendicular to said rotor annular portion mounted in said housing;

a hydraulically actuated piston slidably received in said cylinder along said axis having one end facing said rotor annular portion and a blind bore extending from said end;

an operating rod operatively connected between said piston and said plate;

a first annular groove on an inner surface of a blind bore in said piston;

a second annular groove on an outer surface of said operating rod;

a snap ring including a chamfered outer periphery for compressing said snap ring upon application of an extraction force on said operating rod, said chamfered outer periphery being operative to reduce said extraction force required for servicing said disc brake assembly, said snap ring being adapted to releasably couple said second and first annular grooves upon insertion of said operating rod in said blind bore of said piston, thereby preventing substantial axial movement between said operating rod and said piston during operation while allowing said operating rod to be released for servicing said disk brake assembly;

whereby said piston is movable in a direction along said axis to frictionally engage said lining member against said rotor annular portion.

* * * * *